United States Patent
Fujiwara

(10) Patent No.: US 8,705,066 B2
(45) Date of Patent: Apr. 22, 2014

(54) IMAGE PROCESSING SYSTEM ADAPTED TO ELIMINATE A DIFFERENCE BETWEEN STORED IMAGE DATA AND IMAGE DATA TO BE PRINTED

(75) Inventor: Noriharu Fujiwara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 483 days.

(21) Appl. No.: 12/840,335

(22) Filed: Jul. 21, 2010

(65) Prior Publication Data
US 2011/0019221 A1 Jan. 27, 2011

(30) Foreign Application Priority Data
Jul. 24, 2009 (JP) .................. 2009-173158

(51) Int. Cl.
*G06K 15/00* (2006.01)
*H04N 1/60* (2006.01)

(52) U.S. Cl.
USPC ........................................ 358/1.14; 358/1.18

(58) Field of Classification Search
USPC ............... 358/1.1, 1.9, 1.14, 1.15, 1.18, 1.16, 358/1.13
See application file for complete search history.

(56) References Cited

U.S. PATENT DOCUMENTS

| | | | |
|---|---|---|---|
| 7,715,059 B2 * | 5/2010 | Advocate et al. | 358/405 |
| 7,773,244 B2 * | 8/2010 | Yano et al. | 358/1.15 |
| 2002/0171864 A1 * | 11/2002 | Sesek | 358/1.15 |
| 2006/0087680 A1 * | 4/2006 | Maeda | 358/1.15 |
| 2008/0174820 A1 * | 7/2008 | Furuhashi et al. | 358/1.16 |

FOREIGN PATENT DOCUMENTS

JP 08-090840 A 4/1996

* cited by examiner

*Primary Examiner* — Gabriel Garcia
(74) *Attorney, Agent, or Firm* — Panitch Schwarze Belisario & Nadel LLP

(57) ABSTRACT

A image process system is supplied that comprises a printer 2 capable of printing on the basis of image data outputted through a personal computer (PC) 1 and the like, wherein the PC 1 comprises a judging section 24 that judges whether or not a saving before the print of the image data has been performed; a print execution judging section 31 that judges whether or not to perform the print of the image data on the basis of the judgment result through the judging section 24; and an image forming section 33 that forms image of the image data capable of being printed on the basis of the judgment result of the print execution judging section 31.

15 Claims, 18 Drawing Sheets

IMAGE PROCESSING SYSTEM ADAPTED TO ELIMINATE A DIFFERENCE BETWEEN STORED IMAGE DATA AND IMAGE DATA TO BE PRINTED

FIELD OF THE INVENTION

The invention relates to an image process system that forms image through a printer and the like on the basis of image data from an image process apparatus such as a personal computer (hereinafter: PC) and the like.

BACKGROUND OF THE INVENTION

The image process system has a series of functions such as document making, saving and print, and also has an edit function so as to appropriately perform amendment and deletion of document as need arises from user.

Thus, it is possible for user to save image data in the storage section on the way of making the image data, and after the image data is made, irrespective of print, it is possible for user to make similar image data by using the image data and to make a revised version of the original image data.

The technology that relates to such edit function is disclosed, for example, in the following patent document 1.

The image process system has an input means that inputs image data and the like, an editing and proofreading means that sets a document attribute such as kind of character, kind of line and the like into the image data, a displaying means that displays an input and edit condition of the image data, a storing means that stores the edited image data, and a print means that printed the made image data.

Patent document 1: Japan patent publication of No. 08-090840

By the way, in the edit function of such image process system, after user operates an edit completion, it becomes a system that urges user to make a selection about a data process after the edit by displaying a dialogue display such as "save" or "save as" on the display.

However, in the former image process system, for example, after image data has been once saved in the storage section, when a print of the image data is performed just after the edit by taking out the image data from the storage section, it can be occurred that the edit operation is made to be completed without saving the edited image data in the storage section by user's mistake. As a result, there is a problem that the image data that has been edited and printed is erased and difference occurs between the printed image and the content of the un-edited image data that is saved in the PC.

SUMMARY OF THE INVENTION

It is, therefore, an object of the invention to provide an image process system that can eliminate the difference of the printed document or image from the image data stored in the PC, without erasing the printed image data by mistake.

That is, an aspect of the invention is to provide an image process system capable of printing on the basis of image data that is outputted through an image process apparatus, wherein the image process apparatus comprises: a judging section that judges whether or not a saving before the print of the image data has been performed; a print execution judging section that judges whether or not to perform the print of the image data on the basis of the judgment result through the judging section; and an image forming section that forms image of the image data capable of being printed on the basis of the judgment result of the print execution judging section.

The Effect of the Present Invention:

According to the present invention, by judging whether or not a saving before the print of the image data has been performed through the judging section and by judging whether or not to perform a print of the image data on the basis of the judgment result of the judging section through the print execution judging section, a saving of the edited image data is urged before the print with respect to the user, and image of the image data capable of being printed is formed after the image data under making is stored temporarily. Therefore, there is an advantage that the difference between the content of the printed document and the content of the image data in the PC is prevented.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will be described in detail hereinbelow with reference to the drawings.

<Embodiment 1>

Figure 2:
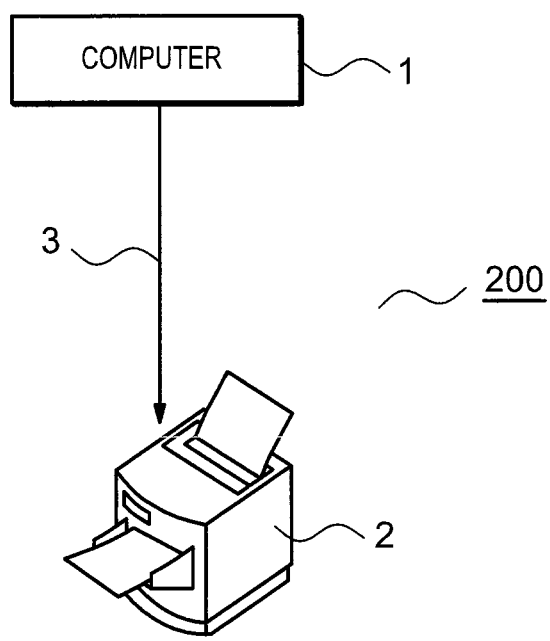
FIG. 2 is a block diagram showing a foundation structure of an image process system of embodiment 1.

FIG. 2 is a block diagram showing a foundation structure of an image process system of embodiment 1.

The image process system 200, as shown by FIG. 2, has a PC 1 and a printer 2 that is connected with the PC 1 through a network 3 such as a LAN and the like. By operating the PC 1 through user, the system is operated on the basis of the system program, and it is possible to perform a making, an editing and a print of image data according to respective application programs.

After user designates a print of image data, according to printer driver program, the image data that should be printed is sent to the printer 2 through the network and is printed.

The PC 1, as shown by a block diagram of hardware of FIG. 3, comprises a center processing unit (hereinafter: CPU) 101, a ROM 102, a RAM 103 and a hard disc 104 those are storing mediums connected with the CPU 101 through an address/data bus 100, an inputting section 106 that is composed of keyboard and the like connected to the address/data bus 100 through an input interface (I/F) 105, a display 108 connected to the address/data bus through a display I/F 107 and a printer I/F 109 connected to a printer 2.

Figure 1:
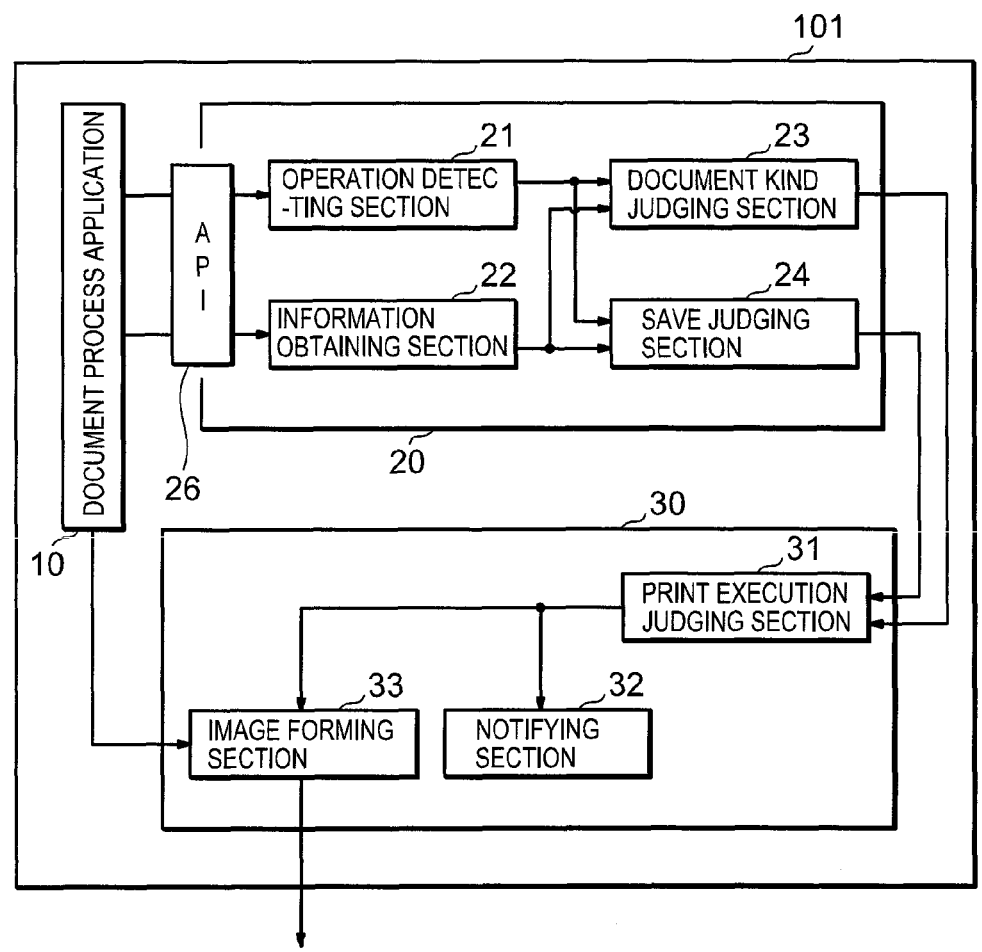
FIG. 1 is a function structural diagram of a CPU that operates on a system program of embodiment 1.

The CPU 101 is composed of a control circuit (not shown), an ALU, a register and the like, and controls operation of the whole PC 1. FIG. 1 is a function structural diagram of the CPU 101 that operates on a system program in the ROM 102.

The CPU 101, as shown by FIG. 1, has a function of a document process application 10, an application monitoring section 20 and a printer driver 30.

The document process application 10 is connected with an operation detecting section 21 and an information obtaining section 22 of the application monitoring section 20, and an image forming section 33 of the printer driver 30, is formed from a software for performing an editing, a saving, a displaying and a print instruction of document information that is composed of document, photograph and drawing, and it performs an editing by saving image data that is made by inputting from the inputting section 106 through user in the hard disc 104 and by reading out it as occasion demands.

The application monitoring section 20 comprises the operation detecting section 21 and the information obtaining section 22, and further comprises a document kind judging section 23 and a save judging section 24 those are respectively connected with the operation detecting section 21 and the information obtaining section 22.

The operation detecting section 21 performs a data communication with the document process application 10 by using an API (application programming I/F) 26 for detecting operation of the document process application 10. Concretely, after user starts operation of the PC 1, the operation detecting section 21 detects whether or not the document process application 10 executes a process corresponding to which operation among the operation (for example, "file open", "newly making", "saving" and "print instruction") with respect to image data as a present process object through the API 26. The API 26 is composed of an intermediate code of form in which the PC 1 can execute or an interpreter and the like.

The respective operation items mentioned above is, for example, coded such as file open (00), newly making (01), saving (10) and print instruction (11), and in the present embodiment, the operation detecting section 21, through detecting the code, detects that which condition is operation of the document process application 10, and supplies the result to the document kind judging section 23 and the save judging section 24.

The information obtaining section 22, similarly to the operation detecting section 21, performs a data communication by using the API 26 with the document process application 10 so as to obtain information with respect to image data that is served as a present process object by user from the document process application 10.

Here, the information with respect to the image data is information that is composed of the following items:

"file name (containing document name)", "saving place (for example, disc and the like in the PC)" of image data; contents information ("character", "drawing" or "photograph" and the like that are contained in image data) of image data; and a flag value showing whether or not edit content of image data has been saved (if it has been saved, "Yes"; if it has not been saved, "No").

These information with respect to the image data are supplied to the document kind judging section 23 and the save judging section 24.

Figure 5:
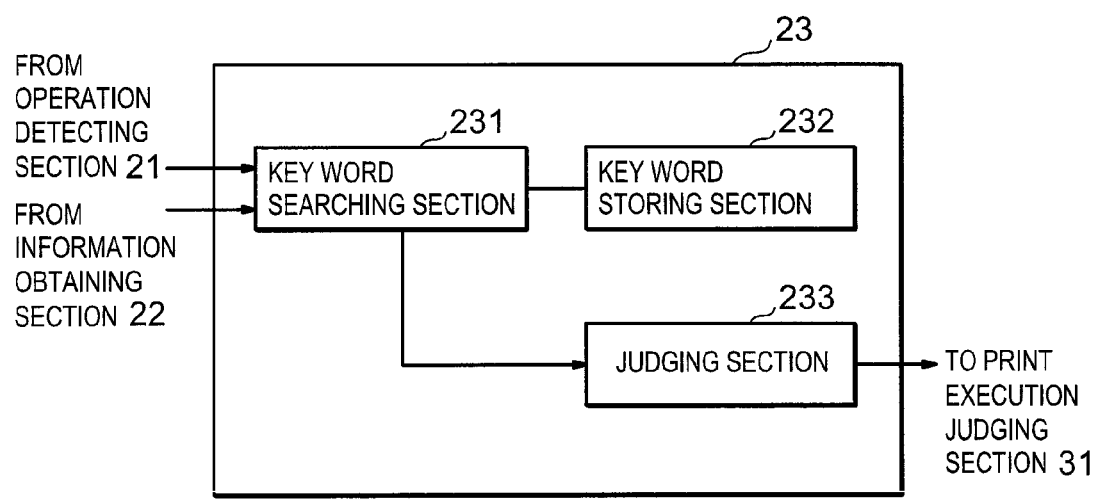
FIG. 5 is a block diagram of a document kind judging section of embodiment 1.

The document kind judging section 23, as shown by FIG. 5, comprises a key word searching section 231 that respectively obtains information from the operation detecting section 21 and the information obtaining section 22, a key word storing section 232 that supplies a key word to the key word searching section 231 and a judging section 233 that judges a key word search result through the key word search-g section 231.

That is, the document kind judging section 23 judges whether or not image data that is served as a present process object by user is specific kind of image data.

The key word searching section 231 obtains contents information contained in image data from the information obtaining section 22, and performs a search of whether or not a key word stored in the key word storing section 232 is contained in the character information of the obtained contents information.

The judging section 233, as a result of the search of the key word searching section 231, if the key word registered in the key word storing section 232 is contained in the contents information, judges that it is a specific kind of document; if the key word is not contained, judges that it is not a specific kind of document.

Figure 7:
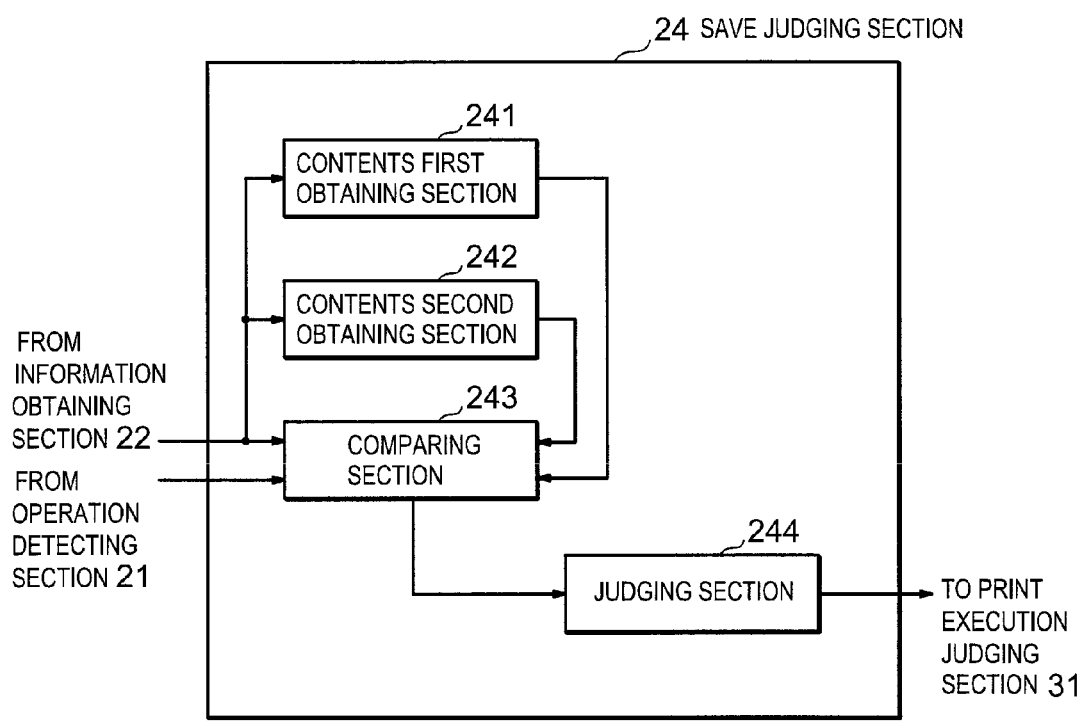
FIG. 7 is a block diagram of a save judging section of embodiment 1.

The save judging section 24, as shown by FIG. 7, comprises a contents first obtaining section 241, a contents second obtaining section 242, a comparing section 243 and a judging section 244.

The save judging section 24 judges whether or not contents information of image data that is obtained by the contents first obtaining section 241 and that has been edited as a present process object and contents information of original image data that is obtained by the contents second obtaining section 242 and that is saved in the hard disc 104 are the same.

The contents first obtaining section 241 obtains contents information of image data that has been edited as the present process object in the document process application 10 from the information obtaining section 22, and sends it to the comparing section 243.

The contents second obtaining section 242 obtains "file name" and "saving place" of image data that is served as the present process object in the document process application 10 from the information obtaining section 22, reads out contents information from data file of image data saved in the hard disc 104 in the PC 1 that is specified by the obtained "file name" and "saving place", and sends the read out contents information to the comparing section 243.

The comparing section 243 compares contents information that is obtained by the contents first obtaining section 241 from the information obtaining section 22 with contents information that is obtained by the contents second obtaining section 242 from the information obtaining section 22.

The judging section 244, as a result of comparing the two contents information in the comparing section 243, if the two contents information are not consistent, judges that it has been edited; and if the two contents information is consistent, judges that it has not been edited.

The printer driver 30 comprises a print execution judging section 31, an image forming section 35 and a notifying section 34, and the print execution judging section 31 is connected to the application monitoring section 20, furthermore, the image forming section 35 is connected to the document process application 10.

The print execution judging section 31, by referring to the judgment result of the document kind judging section 23 and the judgment result of a save judging section 25, on the basis of this, judges whether or not the print of image data of the present process object is performed, and sends the result to the image forming section 35.

The print execution judging section 31 further judges depending on a judgment result of whether or not image data as the present process object judged by the document kind judging section 23 is a specific kind of document, and a judgment result between contents information of image data of the present process object judged by the save judging section 25 and contents information of image data saved in the hard disc 104.

That is, the print execution judging section 31, when the information judged by the document kind judging section 23 that it is a specific kind of image data, or, the information judged by the save judging section 25 that image data of the present process object has been edited, is inputted, outputs an instruction for stopping the print instruction with respect to the notifying section 34.

Figure 9:
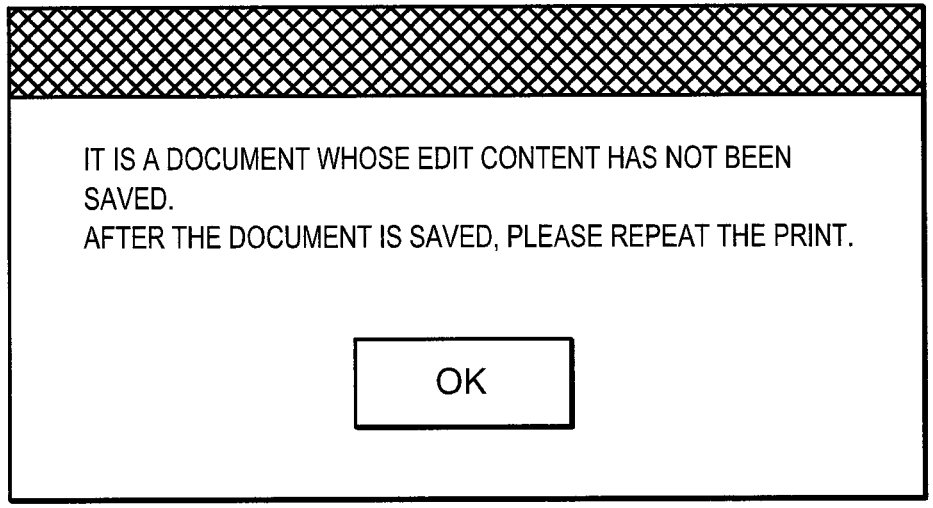
FIG. 9 is an example of dialogue display of embodiment 1.

The notifying section 34 receives an instruction of the print execution judging section 31, before user performs the print of image data, by displaying dialogue "it is a document whose edit content has not been saved . . . " on the display 108 as shown by FIG. 9, calls user's attention so as to make user sense the idea, and prevents erasing image data by mistake after the print.

The image forming section 35 sends image data received from the document process application 10 and image data judged by the print execution judging section 31 to the printer 2.

The ROM 102 is formed from a nonvolatile storing medium, and in the ROM 102, a system program for controlling a sending of image data to the printer 2 and respective parts of system and the like are stored.

Figure 4:
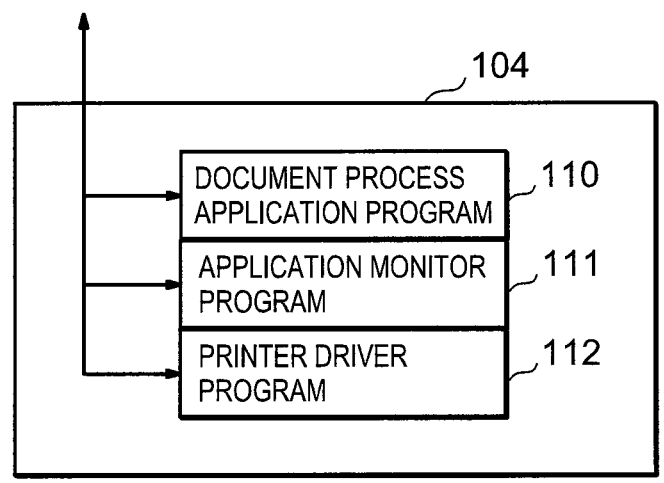
FIG. 4 is a block diagram of a hard disc of embodiment 1.

The hard disc 104 is a storing medium capable of reading and writing larger capacity of data than the ROM 102 and the RAM 103, and as shown by FIG. 4, a document process application program 110, an application monitor program 111 and a printer driver program 112 are stored. These programs function on the basis of the system program in the ROM 102 through the execution of the CPU 101.

The inputting section 106 is composed of keyboard or mouse and the like, and is set capable of instructing according to content, when user instructs the PC 1 to make, to edit and to print image data.

The display 108 is a displaying means composed of liquid crystal and the like, and user of the PC 1 performs a process of a making, an editing, a print instruction and the like of image data by watching the display 108 and operating the inputting section 106 at the same time.

Next, it is to explain operation of an image process system 200 of embodiment 1.

The electric source of the PC 1 and the printer 2 of the image process system 200 is previously set to ON.

User, in the case to make and print image data, makes image data through the inputting section 106 such as keyboard or mouse and the like, and in the case to print image data of the present process object on the paper medium, respective parts of the apparatus operate as stated later.

Figure 6:
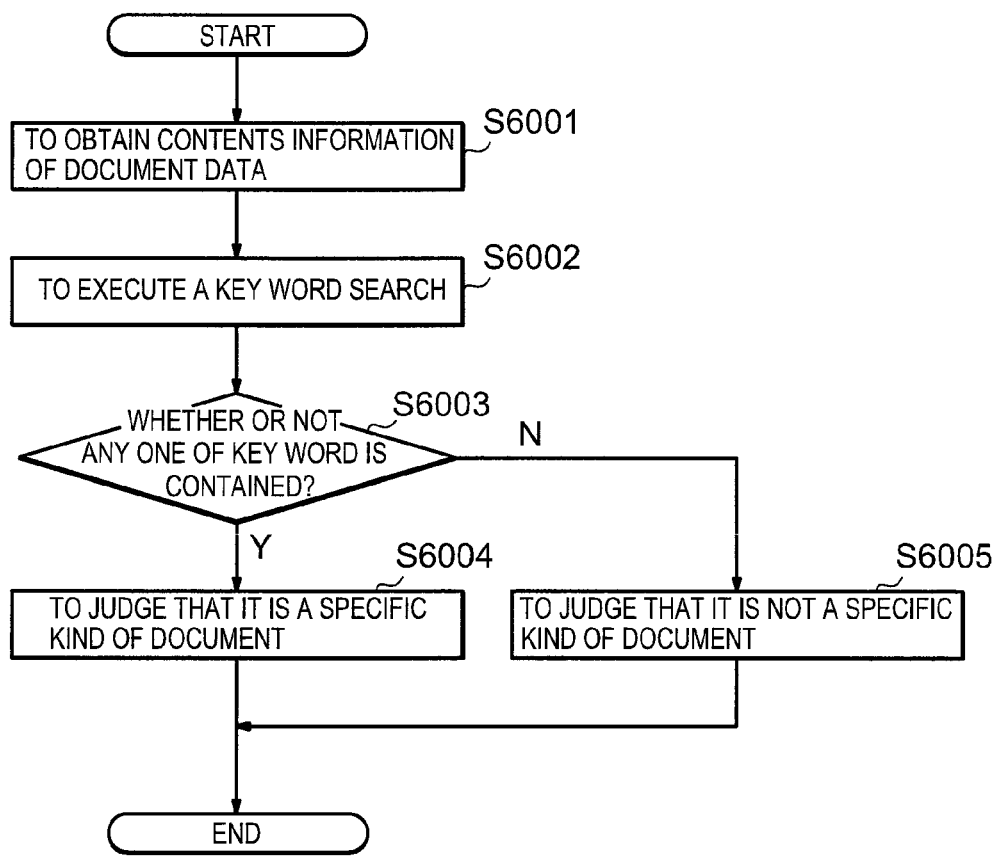
FIG. 6 is an operation flow chart of a document kind judging section of embodiment 1.

Firstly, it is to explain about operation of the document kind judging section 23 of the application monitoring section 20 on the basis of the flow chart of FIG. 6.

(S6001)

On the basis of system program, the CPU 101, with respect to the key word searching section 231 of the document kind judging section 23 as shown by FIG. 5, instructs to obtain contents information contained in image data of the present process object that is being made by user from the document process application 10 through the information obtaining section 22.

(S6002)

The key word searching section 231 performs a search of whether or not a key word stored in the key word storing section 232 is contained in character information of contents information obtained from the information obtaining section 22 on S6001.

(S6003)

The judging section 233, as a result of the search of the key word searching section 231, judges whether or not contents information of image data contains a specific kind of key word.

(S6004)

When it is judged according to the judgment of the judging section 233 that contents information of image data is image data containing a specific kind of key word, the flow is completed by shifting to the print execution judging section 31 (the print is stopped).

(S6005)

On the other hand, when it is judged according to the judgment of the judging section 233 that a specific kind of key word is not contained, an instruction capable of printing image data of the present process object (when image data has been saved at the same time) is sent from the document process application 10 to the image forming section 33 of the printer driver 30.

Figure 8:
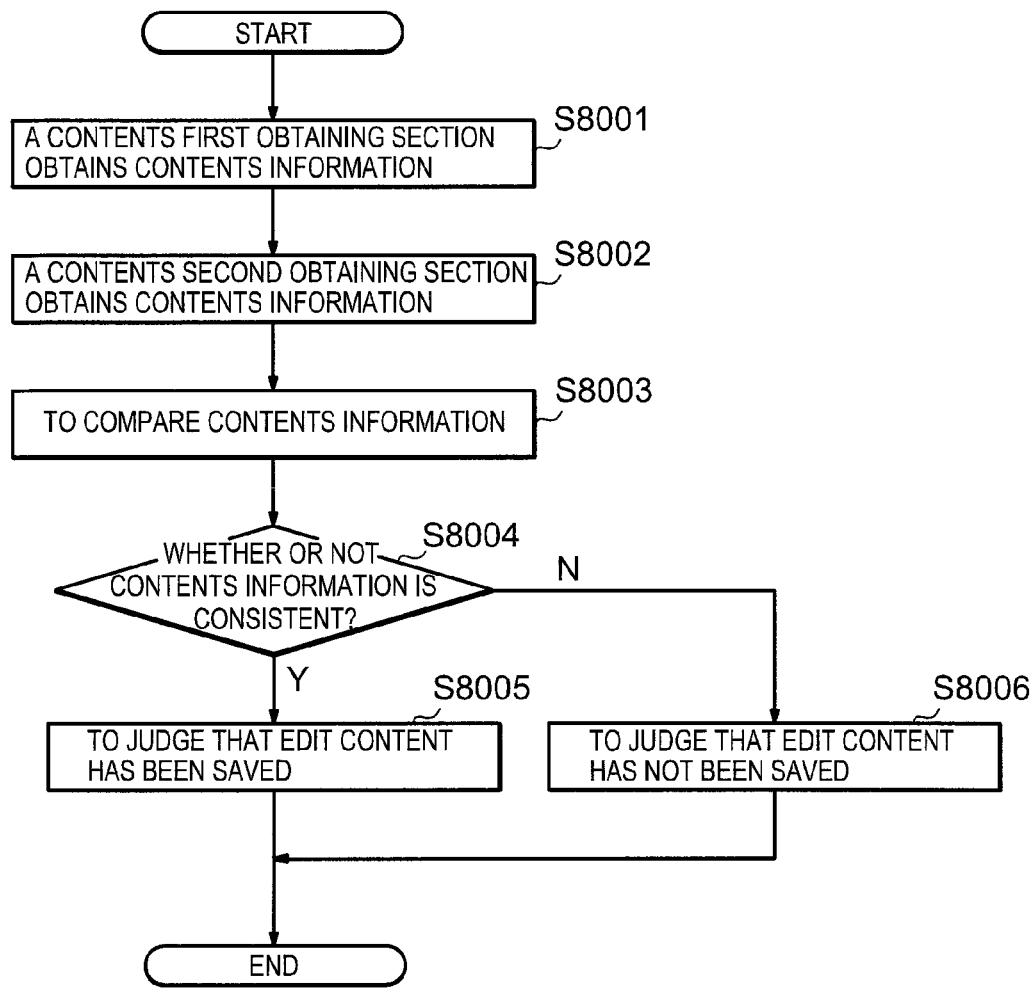
FIG. 8 is an operation flow chart of a save judging section of embodiment 1.

Next, it is to explain about operation of the save judging section 24 of the application monitoring section 20 on the basis of the flow chart of FIG. 8.

(S8001)

On the basis of system program, the CPU 101 instructs to obtain contents information of image data of the present process object from the information obtaining section 22 with respect to the contents first obtaining section 241 of the save judging section 24. Thus, the contents first obtaining section 241 obtains contents information of image data of the present process object from the information obtaining section 22.

(S8002)

On the basis of system program, the CPU 101 instructs to obtain "file name" and "saving place" of image data of a present process object from the information obtaining section 22, and to read out contents information from data file of registered image data specified by the obtained "file name" and "saving place" with respect to the contents second obtaining section 242 of the save judging section 24. Thus, the contents second obtaining section 242 obtains contents information of the registered image data.

(S8003)

Respective contents information those are obtained through both of the obtaining sections are compared by the comparing section 243.

(S8004)

By receiving a result that the comparing section 243 compares both of the contents information, the judging section 244, if both of the contents information are consistent, judges that it has not been edited, and the step is shifted to S8005; on the other hand, if both of the contents information are not consistent, judges that it has been edited, and the step is shifted to S8006.

(S8005)

As a result of judging contents information of the contents first obtaining section 241 and the contents second obtaining section 242 in the judging section 244, a print can be executed because it is judged that contents information is consistent and image data has been edited, and the flow is completed.

(S8006)

On the other hand, as a result of the judgment in the judging section 244, if contents information are not consistent, the print process is stopped because it is judged that image data has not been edited.

Figure 10:
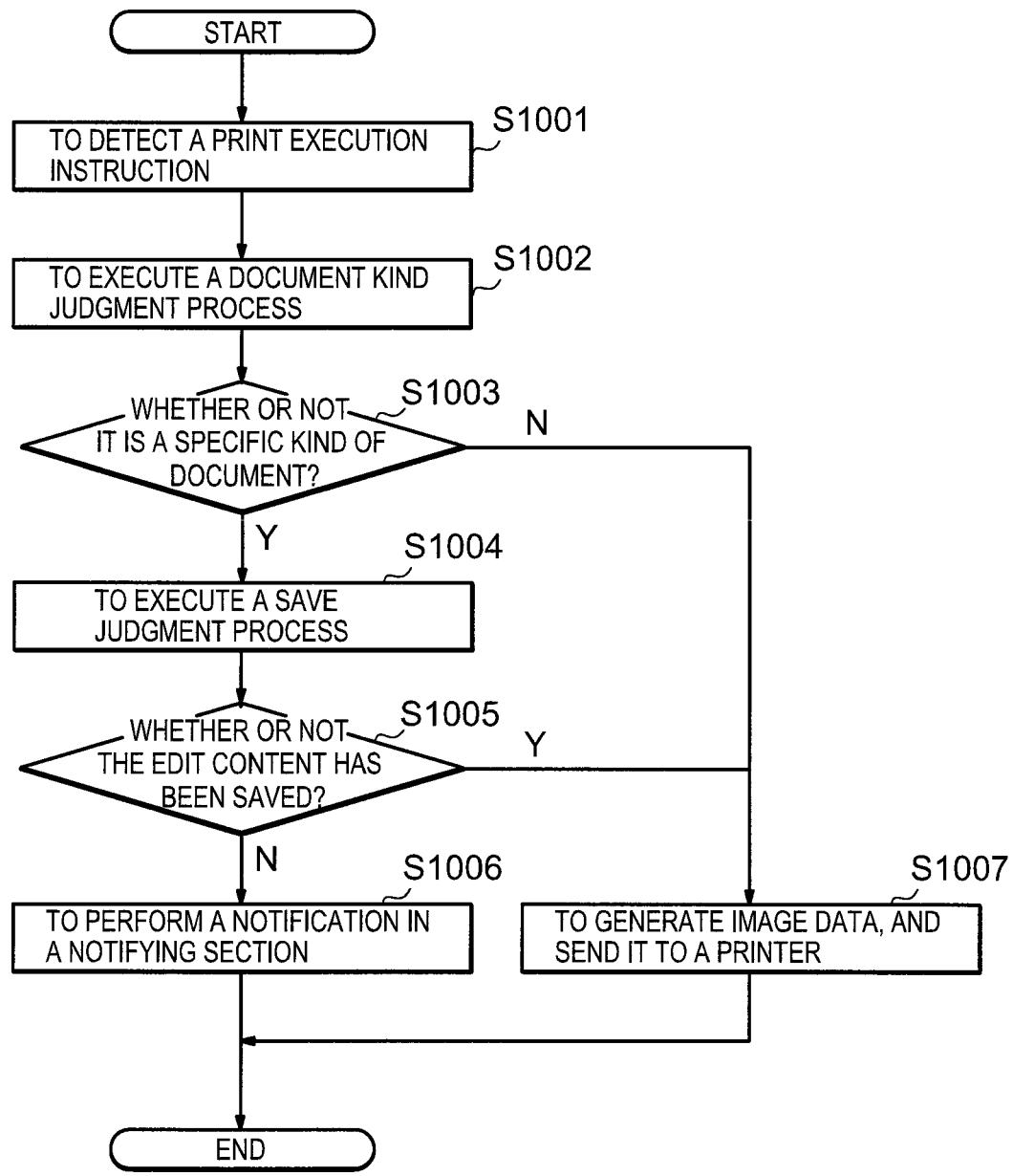
FIG. 10 is an operation flow chart of a document kind judging section of embodiment 1.

Then, when user tries to execute a print of image data under operation of the application monitoring section 20, operation of the PC 1 is made to follow the flow chart of FIG. 10.

(S1001)

According to the print control of the CPU 101, the operation detecting section 21 of the application monitoring section 20 detects that the instruction of "print execution" process is performed with respect to image data of the present process object from the document process application 10.

Further, at the same time, the information obtaining section 22 of the application monitoring section 20 executes to obtain contents information of image data of the present process object from the document process application 10.

The operation detecting section 21 and the information obtaining section 22 respectively communicate the obtained contents information to the document kind judging section 23 and the save judging section 24.

(S1002)

The document kind judging section 23, by contrasting contents information of image data obtained from the operation detecting section 21 and the information obtaining section 22 and key word registered in the key word storing section 232, executes a judgment process of whether or not the registered key word is contained in the image data of the present process object.

(S1003)

On S1002, when the document kind judging section 23 judges that image data of the present process object is a specific kind of document, the application monitoring section 20 shifts the step to S1004, on the other hand, when it is not judged that it is a specific kind of document, the step is shifted to S1007.

(S1004)

The save judging section 24 executes a judgment process. That is, by comparing contents information from the contents first obtaining section 241 and the contents second obtaining section 242, if both of the contents information are consistent, it is judged that image data of the present process object has not been edited; if both of the contents information are not consistent, it is judged that it has been edited.

(S1005)

In the case that it is judged by the save judging section 24 that contents information of image data of the present process object are not consistent in S1004, the application monitoring section 20 shifts the step to S1006.

On the other hand, in the case that it is judged that contents information are consistent, the step is shifted to S1007.

(S1006)

On S1005, in the case that image data of the present process object is a specific kind of document, or in the case that image data of the present process object is not a specific kind of document but has been edited, the print execution judging section 31 of the printer driver 30 stops a print execution, and a notifying section 32 performs a notification with respect to user by displaying dialogue "It is a document whose edit content has not been saved . . . " on the display 108 as shown by FIG. 9.

(S1007)

On S1005, when image data of the present process object is not a specific kind of document, and when contents information of image data registered in the ROM 102 and the like is consistent with contents information of the image data of the present process object, it is regarded that it has not been edited, and the print execution judging section 31 instructs the image forming section 33 to execute the print, and the image forming section 33 sends the image data to the printer 2.

According to such function, even when a print instruction of image data is outputted in the document process application 10, if image data of the present process object corresponds to a specific kind of document, and if the image data of the present process object has not been edited, it is possible for the image process system 200 not to perform a print by regarding the print instruction as invalid and but to perform a print after confirming that it has been edited. Therefore, it is possible to avoid such problem that content of the printed document is different from content of image data saved in the PC 1, especially, it is an effective means capable of preventing mistaking of important documents.

Moreover, in the judgment process of the document kind judging section 23, it may be made to obtain a file name of image data from the information obtaining section 22, to regard a specific series of characters such as "budget ledger", "settlement document", "patent specification" and the like as key words, to judge whether or not the file name contains them, and to judge it an important document if contained.

Further, there is a case to judge whether or not image data of the present process object is a secret document that is important for user, at that time, it may be made to regard terms such as "for internal use only", "Confidential", "company secret" and the like as key words, to store them in the key word storing section 232, and to compare contents information obtained from the document process application 10 so as to judge whether or not such key words are contained in the image data of the present process object.

Furthermore, in the judgment process of the save judging section 24, when a flag value representing whether or not the edit content of image data has been saved is obtained from the information obtaining section 22, it may be made to judge that the edit content has been saved, if the flag value is 1; to judge that the edit content has not been saved, if the flag value is 0.

<Embodiment 2>

Figure 12:
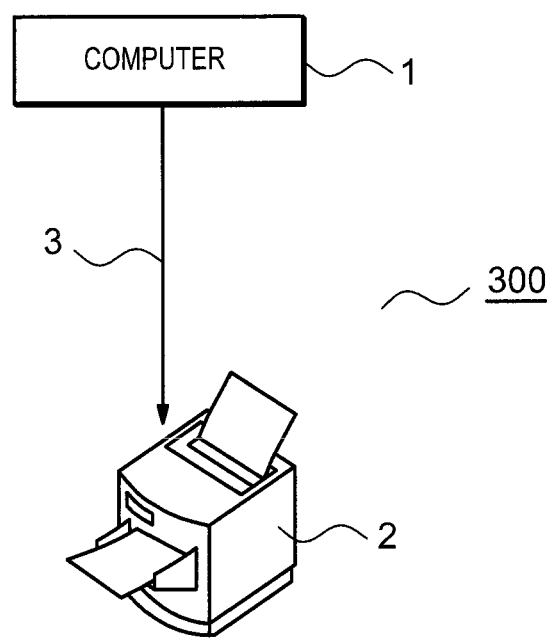
FIG. 12 is a block diagram showing a foundation structure of an image process system of embodiment 2.

FIG. 12 is a block diagram showing a foundation structure of an image process system of embodiment 2. Moreover, the same signs are assigned to the same parts with embodiment 1, and explanation is omitted.

The image process system 300, as shown by FIG. 12, has a PC 1 and a printer 2 that is connected with the PC 1 through a network 3 such as a LAN and the like. By operating the PC 1 through user, the system is operated on the basis of the system program, and it is possible to perform a making, an editing and a print of image data according to respective application programs.

After user designates a print of image data, according to printer driver program, the image data that should be printed is sent to the printer 2 through the network 3 and is printed.

Figure 3:
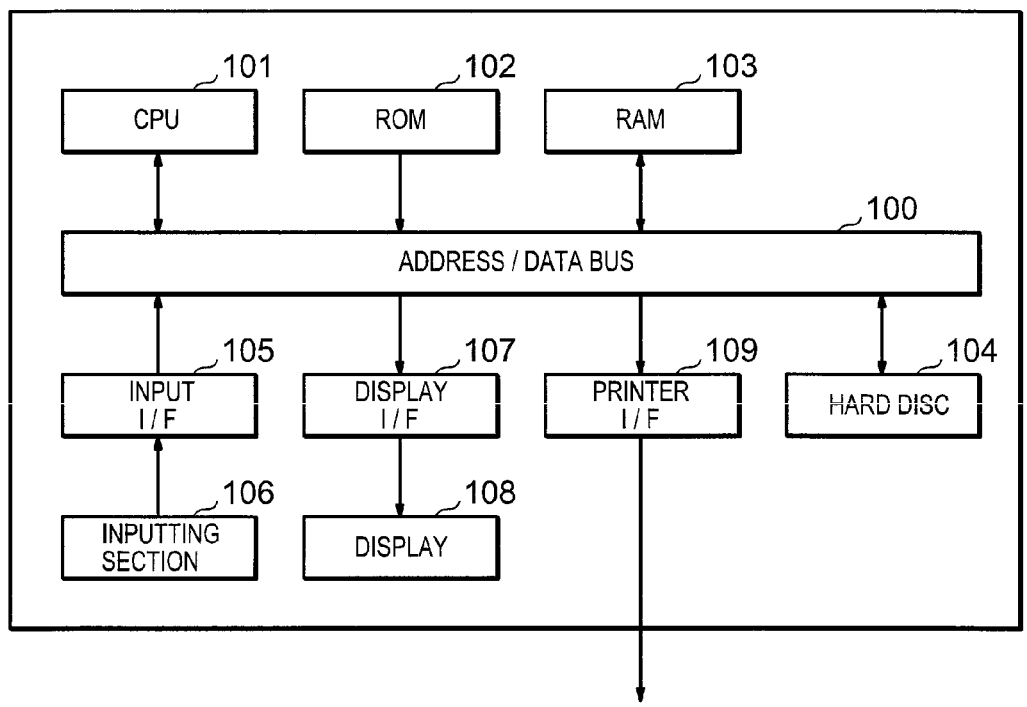
FIG. 3 is a block diagram of a PC side of embodiment 1.

The PC 1, as shown by FIG. 3, comprises a CPU 101, a ROM 102, a RAM 103 and a hard disc 104 those are storing mediums connected with the CPU 101 through an address/data bus 100, an inputting section 106 that is composed of keyboard and the like connected to the address/data bus 100 through an input interface (I/F) 105, a display 108 connected to the address/data bus 100 through a display I/F 107 and a printer I/F 109 connected to a printer 2.

Figure 11:
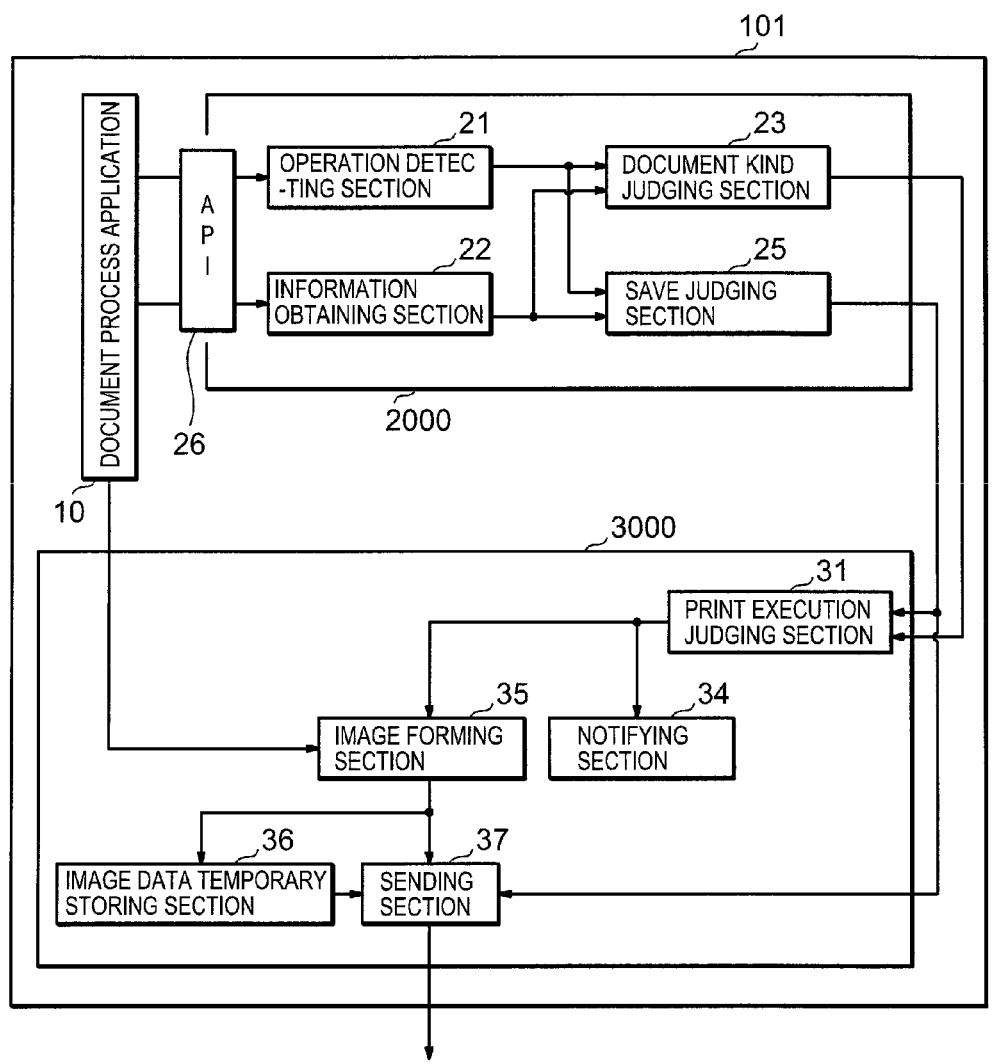
FIG. 11 is a function structural diagram of a CPU that operates on a system program of embodiment 2.

The CPU 101 is composed of a control circuit (not shown), an ALU, a register and the like, and controls operation of the whole PC 1. FIG. 11 is a function structural diagram of a CPU 101 that operates on a system program and the like in the ROM 102.

The CPU 101, as shown by FIG. 11, has a function of a document process application 10, an application monitoring section 2000 and a printer driver 3000.

The document process application 10 is connected with an operation detecting section 21 and an information obtaining section 22 of the application monitoring section 2000, and an image forming section 35 of the printer driver 3000, is formed from a software for performing an editing, a saving, a displaying and a print instruction of document information that is composed of document, photograph and drawing, and it performs an editing by saving image data that is made by inputting from the inputting section 106 through user in the hard disc 104 and by reading out it as occasion demands.

The application monitoring section 2000 comprises the operation detecting section 21 and the information obtaining section 22, and further comprises a document kind judging section 23 and a save judging section 24 those are respectively connected with the operation detecting section 21 and the information obtaining section 22.

The operation detecting section 21 performs a communication with the document process application 10 by using an API 26 for detecting operation of the document process application 10. Concretely, after user starts operation of the PC 1, the operation detecting section 21 detects whether or not the document process application executes a process corresponding to which operation among the operation (for example, "file open", "newly making", "saving" and "print instruction") with respect to image data as a present process subject through the API 26. The API 26 is composed of an intermediate code of form in which the PC 1 can execute or an interpreter and the like.

The respective operation items mentioned above is, for example, coded such as file open (00), newly making (01), saving (10) and print (11), and in the present embodiment, the operation detecting section 21, through detecting code, detects that which condition is operation of the document process application 10, and supplies the result to the document kind judging section 23 and the save judging section 24, too.

The information obtaining section 22, similarly to the operation detecting section 21, performs a data communication by using the API 26 with the document process application 10 so as to obtain information with respect to image data that is served as a present process object by user from the document process application 10.

Here, the information with respect to the image data is information that is composed of the following items:
"file name (containing document name)", "saving place (for example, disc and the like in the PC)" of image data;
contents information ("character", "drawing" or "photograph" and the like that are contained in image data) of image data; and
a flag value showing whether or not edit content of image data has been saved (if it has been saved, "Yes"; if it has not been saved, "No").

These information with respect to the image data are supplied to the document kind judging section 23 and the save judging section 24.

The document kind judging section 23, as shown by FIG. 5, comprises a key word searching section 231 that respectively obtains information from the operation detecting section 21 and the information obtaining section 22, a key word storing section 232 that supplies a key word to the key word searching section 231 and a judging section 233 that judges a key word search result through the key word searching section 231.

That is, the document kind judging section 23 judges whether or not image data that is served as a present process object by user is specific kind of image data.

The key word searching section 231 obtains contents information contained in image data from the information obtaining section 22, and performs a search of whether or not a key word stored in the key word storing section 232 is contained in the character information of the obtained contents information.

The judging section 233, as a result of the search of the key word searching section 231, if the key word registered in the key word storing section 232 is contained in the contents information, judges that it is a specific kind of document; if the key word is not contained, judges that it is not a specific kind of document.

Figure 13:
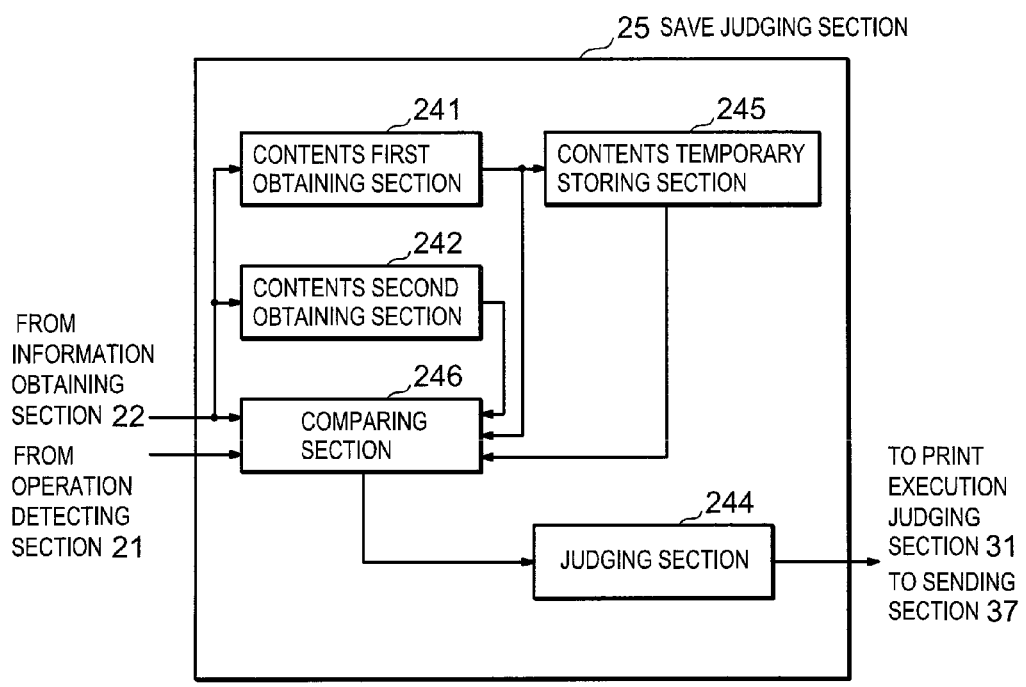
FIG. 13 is a block diagram of a save judging section of embodiment 2.

The save judging section 25, as shown by FIG. 13, comprises a contents first obtaining section 241, a contents second obtaining section 242, a contents temporary storing section 245, a comparing section 246 and a judging section 244.

The save judging section 25 judges whether or not contents information of image data that is obtained by the contents first obtaining section 241 and that has been edited as a present process object and contents information of image data that is obtained by the contents second obtaining section 242 and that is saved in the hard disc 104 are the same.

The contents first obtaining section 241 obtains contents information of image data that has been edited as the present process object in the document process application 10 from the information obtaining section 22, and sends it to the comparing section 243.

The contents second obtaining section 242 obtains "file name" and "saving place" of image data that is served as the present process object in the document process application 10 from the information obtaining section 22, reads out contents information from data file of image data saved in the hard disc 104 in the PC 1 that is specified by the obtained "file name" and "saving place", and sends the read out contents information to the comparing section 243.

The contents temporary storing section 245 temporarily stores and saves contents information that is obtained by the contents first obtaining section 241 from an information obtaining section.

The comparing section 246 performs a comparing process of contents information obtained by the contents first obtaining section 241 from the information obtaining section 22 and contents information obtained by the contents second obtaining section 242 from the information obtaining section 22, and further compares contents information saved in the contents temporary storing section 245 with contents information obtained by the contents first obtaining section 241.

The judging section 244, as a result of comparing respective contents information in the comparing section 246, if the respective contents information are not consistent, judges that it has been edited; and if the respective contents information are consistent, judges that it has not been edited.

The printer driver 3000 comprises a print execution judging section 31, an image forming section 35, a notifying section 34, an image data temporary storing section 36 and a sending section 37, and the print execution judging section 31 is connected to the application monitoring section 2000, the notifying section 34 and the image forming section 35. Further, the image forming section 35 is connected to the document process application 10, the sending section 37 and the image data temporary storing section 36.

The print execution judging section 31, by referring to the judgment result of the document kind judging section 23 and the judgment result of a save judging section 25, on the basis of this, judges whether or not the print of image data of the present process object is performed, and sends the judgment result to the image forming section 35.

The print execution judging section 31 further judges depending on a judgment result of whether or not image data as the present process object judged by the document kind judging section 23 is a specific kind of document, and a judgment result between contents information of image data of the present process object judged by the save judging section 25 and contents information of image data saved in the hard disc 104 and the like.

That is, the print execution judging section 31, when the information judged by the document kind judging section 23 that it is a specific kind of image data, or, the information judged by the save judging section 25 that image data of the present process object has been edited, is inputted, outputs an instruction for stopping the print instruction with respect to the notifying section 34.

The notifying section 34 notifies of reserving the sending of image data until the image data is saved on the display 108.

Figure 18:
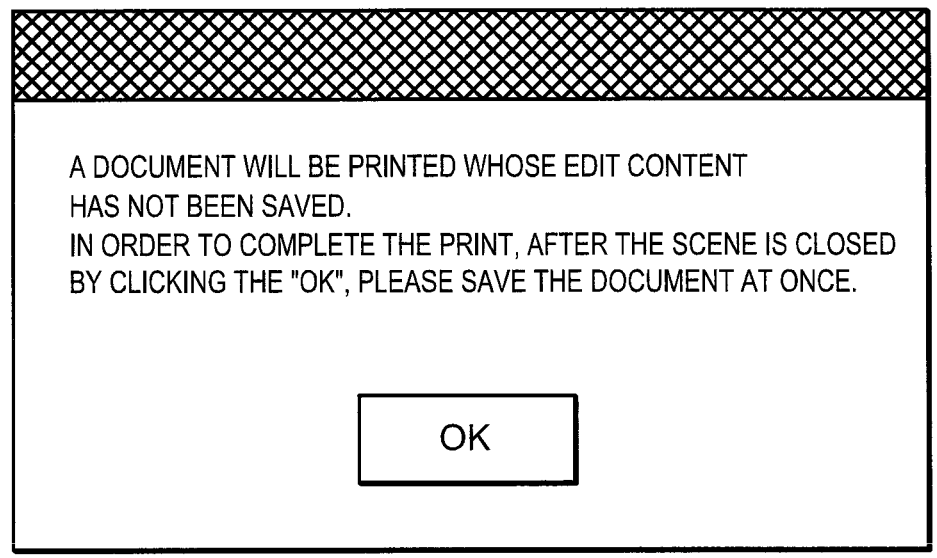
FIG. 18 is an example of a dialogue display of embodiment 2.

For example, by displaying dialogue "A document will be printed whose edit content has not been saved . . . " on the display 108 as shown by FIG. 18, the notifying section 34 calls user's attention so as to make user sense the idea, and prevents erasing image data by mistake after the print.

The image forming section 35 converts image data received from the document process application 10 into image data capable of being printed, and stores it in the image data temporary storing section 36 or sends it to the sending section 37.

The image data temporary storing section 36 temporarily stores image data that is formed in the image forming section 35.

The sending section 37, by receiving image data from the image forming section 35, or by reading out image data from the image data temporary storing section 36, sends the image data to the printer 2.

The ROM 102 is formed from a nonvolatile storing medium, and in the ROM 102, a system program for controlling a sending of image data to the printer 2 and respective parts of system and the like are stored.

The hard disc 104 is a storing medium capable of reading and writing larger capacity of data than the ROM 102 and the RAM 103, and as shown by FIG. 4, a document process application program 110, an application monitor program 111 and a printer driver program 112 are stored. These programs operate on the basis of the system program in the ROM 102 through the execution of the CPU 101.

Next, it is to explain operation of the image process system 300 of embodiment 2.

The electric source of the PC 1 and the printer 2 of the image process system 300 is previously set to ON.

User, in the case to make and print image data, makes image data through the inputting section 106 such as keyboard or mouse and the like, and in the case to print the image data on the paper medium, respective parts of apparatus operate as stated later.

Figure 14:
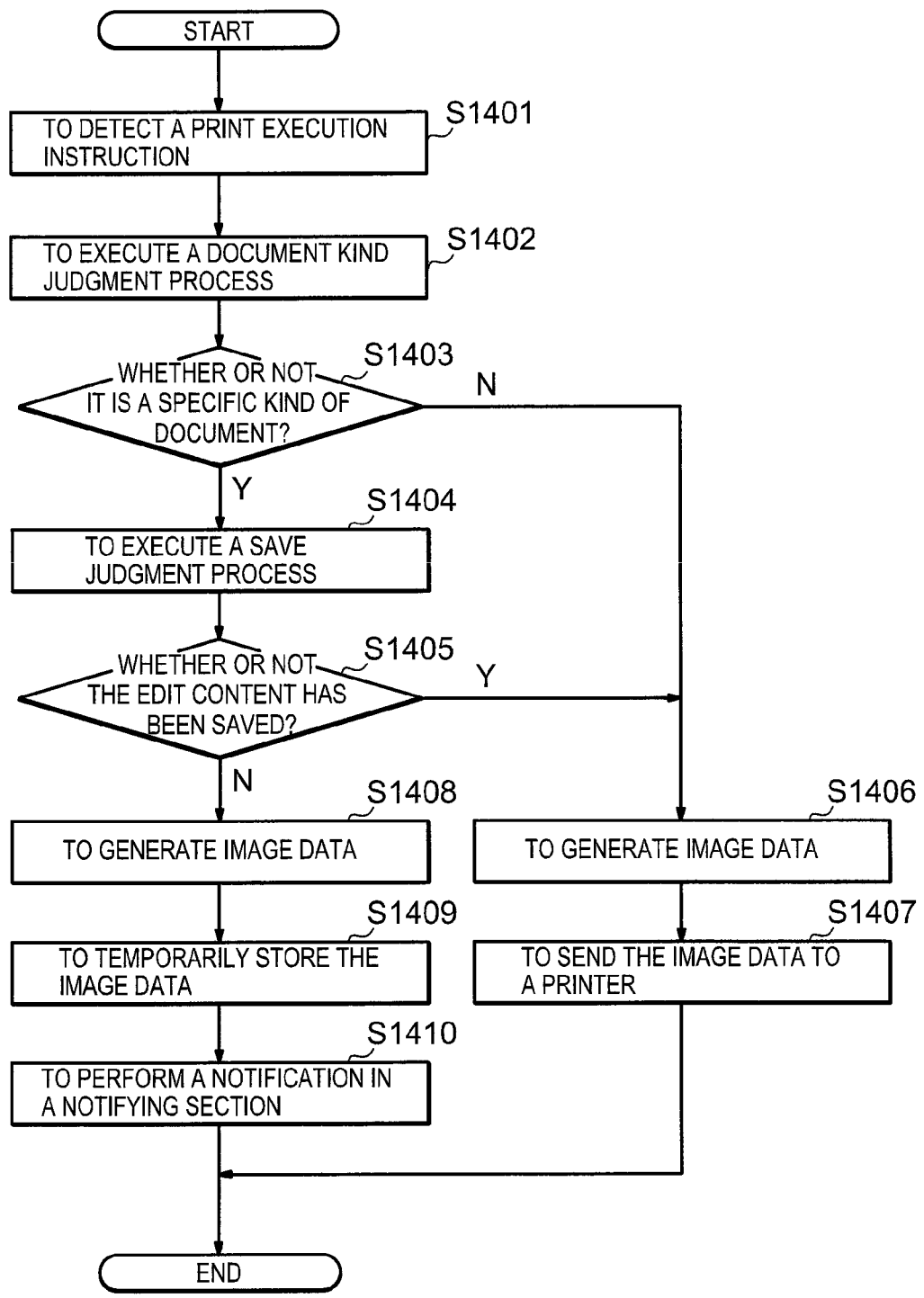
FIG. 14 is a flow chart of print execution operation of embodiment 2.

Firstly, it is to explain about operation of the PC 1 by following the flow chart of FIG. 14 in the case that user tries to execute the print of image data of the present process object under the operation of the application monitoring section 2000.

(S1401)

According to the print control of the CPU 101, the operation detecting section 21 of the application monitoring section 2000 detects from the document process application 10 that the instruction of the "print execution" process is performed with respect to image data of the present process object.

Further, at the same time, the information obtaining section 22 of the application monitoring section 2000 obtains contents information of image data of the present process object from the document process application 10.

The operation detecting section 21 and the information obtaining section 22 communicate the respectively obtained contents information to the document kind judging section 23 and the save judging section 25 respectively.

(S1402)

The document kind judging section 23, by making key word registered in the keyword storing section 232 of the document kind judging section 23 contrast with contents information of image data obtained from the operation detecting section 21 and the information obtaining section 22, executes a judgment process of whether or not the registered key word is contained in the image data of the present process object.

(S1403)

On S1402, when the document kind judging section 23 judges that image data of the present process object is a specific kind of document, the application monitoring section 2000 shifts the step to S1404, on the other hand, when it is not judged that it is a specific kind of document, the step is shifted to S1406.

(S1404)

The save judging section 25 executes a judgment process. That is, by comparing contents information from the contents first obtaining section 241 and the contents second obtaining section 242, if the two contents information are consistent, it is judged that image data of the present process object has not been edited; if the two contents information are not consistent, it is judged that it has been edited.

(S1405)

According to the save judging section 25, if image data of the present process object is judged that it has been edited in S1404, the application monitoring section 20 shifts the step to S1408.

On the other hand, in the case that it is judged that it has not been edited, the step is shifted to S1406.

(S1406)

The CPU 101 instructs to convert image data of the present process object into data capable of being printed with respect to the image forming section 35 of the printer driver 3000, and the step is shifted to S1407.

(S1407)

The sending section 37 of the printer driver 3000 completes the flow by sending image data to the printer 2.

(S1408)

According to the save judging section 25, in the case that it is judged that image data of the present process object has been edited in S1405, the image forming section 35 converts image data of the present process object into image data capable of being printed, and the step is shifted to S1409.

(S1409)

The printer driver 3000 stores the image data capable of being printed in the image data temporary storing section 36.

(S1410)

On S1005, in the case that image data of the present process object contains a specific kind of key word, or when image data of the present process object does not contain a specific kind of key word but has been edited, the notifying section 34 of the printer driver 3000 performs it notification with respect to user by displaying dialogue "A document will be printed whose edit content has not been saved . . . " on the display 108 as shown by FIG. 18.

Figure 15:
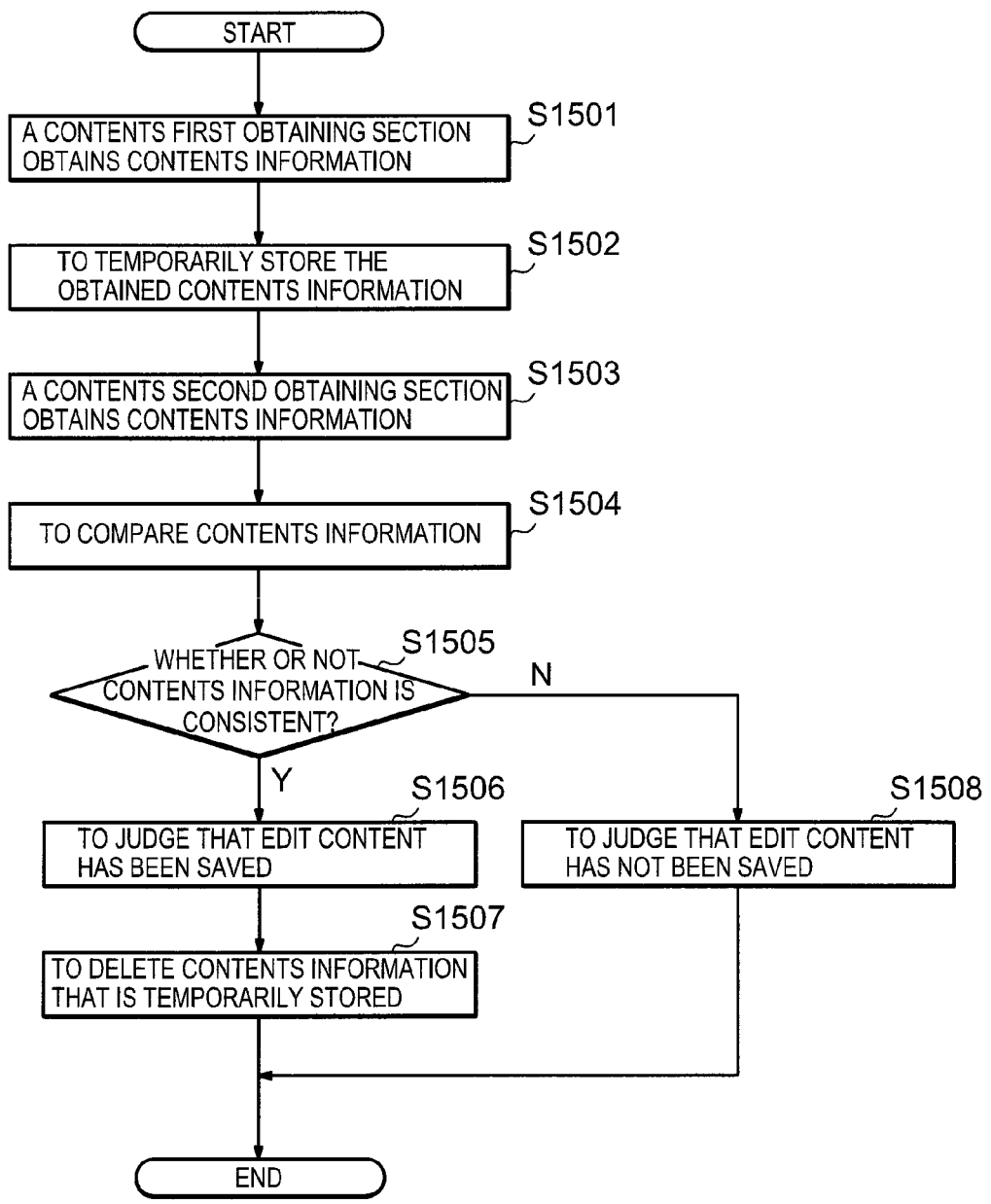
FIG. 15 is an operation flow chart of a save judging section of embodiment 2.

Next, it is to explain about operation of the save judging section 25 in the case that the document is instructed to print in the document process application 10 on the basis of the FIG. 15. At this time, it is a process that is performed in S1404 of the flow chart of FIG. 14.

(S1501)

The CPU 101, with respect to the application monitoring section 2000, instructs the contents first obtaining section 241 of the save judging section 25 to obtain contents information from the information obtaining section 22.

(S1502)

Further, the CPU 101, with Respect to the Application monitoring section 2000, instructs to temporarily store the contents information obtained by the contents first obtaining section 241 of the save judging section 25 in the contents temporary storing section 245.

(S1503)

Furthermore, the CPU 101, with respect to the application monitoring section 2000, instructs the contents second obtaining section 242 of the save judging section 25 to obtain contents information from an information obtaining section.

(S1504)

The comparing section 246 of the save judging section 25 compares contents information obtained in S1501 with respective contents information obtained in S1503.

(S1505)

The save judging section 25, as a result of comparing both of the contents information by the comparing section 246, if both of the contents information are consistent, shifts the step to S1506; and if both of the contents information are not consistent, shifts the step to S1508.

(S1506)

When the contents information are consistent, the judging section 244 judges that image data of the present process object has not been edited (printable).

(S1507)

The CPU 101 deletes contents information that is temporarily stored in the contents temporary storing section 245, and completes the flow.

(S1508)

On the other hand, when the contents information are not consistent, the judging section 244 judges that image data of the present process object has been edited (at this time, on the condition of print reservation).

Figure 17:
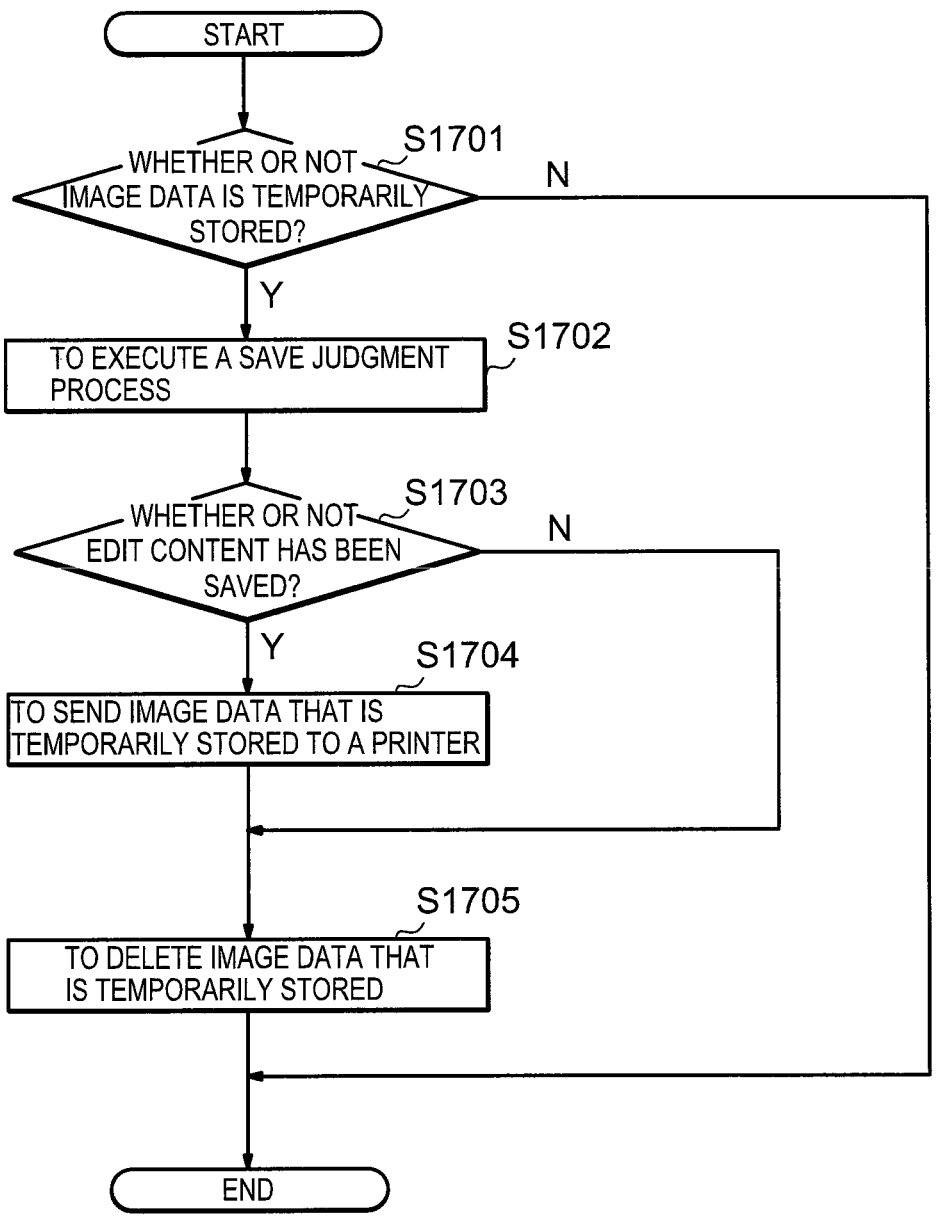
FIG. 17 is a flow chart of operation of a PC of embodiment 2.

Next, it is to explain about operation of the PC 1 on the basis of the flow chart of FIG. 17 in the case that saving operation of image data is performed in the document process application 10.

(S1701)

Figure 16:
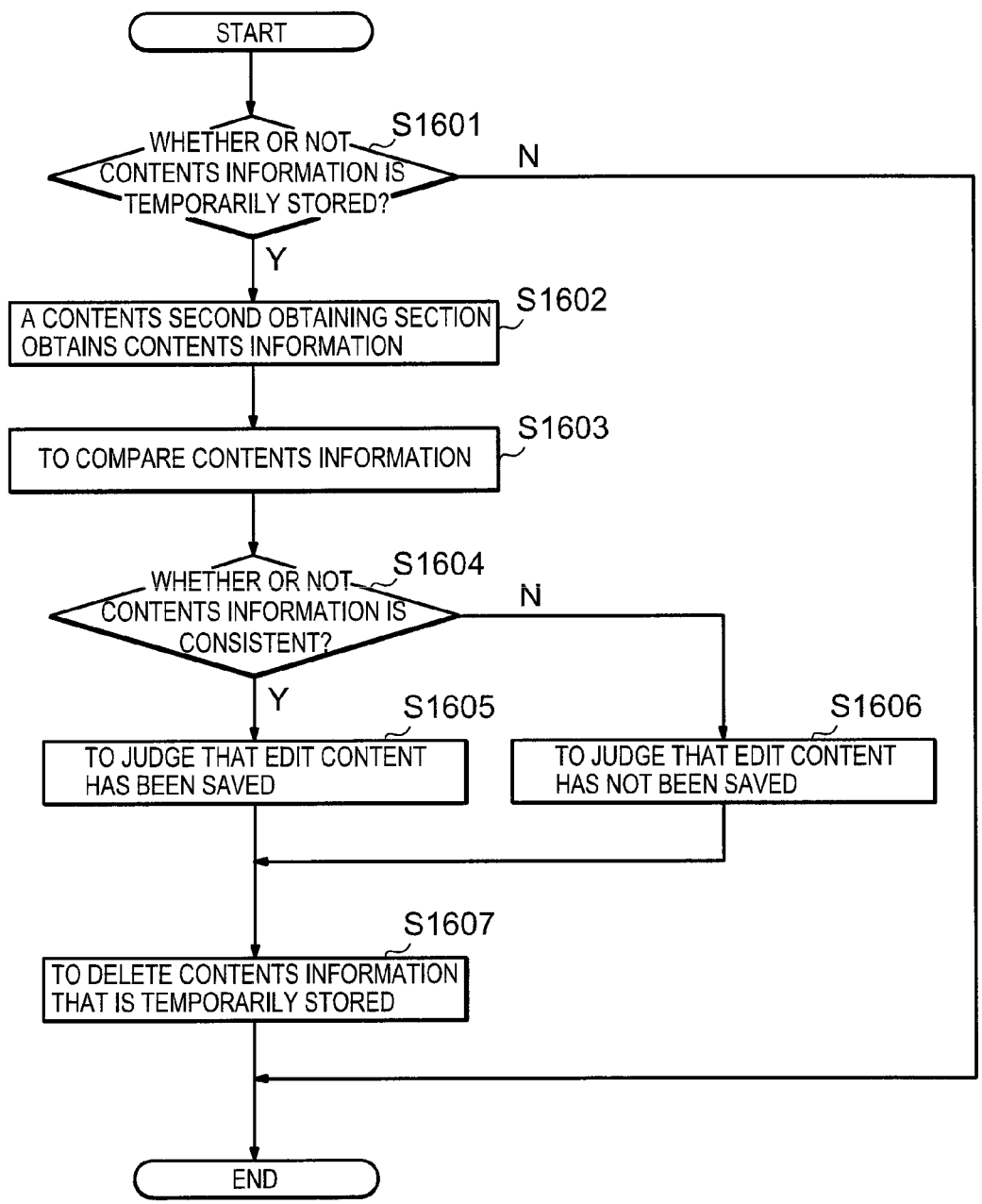
FIG. 16 is an operation flow chart of a save judging section of embodiment 2 (contents information temporary memory)

On one hand, if image data after the edit is temporarily stored in the image data temporary storing section 36 of the printer driver 3000, the printer driver 3000 shifts the step to S1702; on the other hand, if image data after the edit has not been temporarily stored in the image data temporary storing section 36, the printer driver 3000 makes the flow complete (to shift to a flow chart of FIG. 16).

(S1702)

The save judging section 25 of the application monitoring section 2000 executes a judgment process by making image data be temporarily stored in the image data temporary storing section 36.

(S1703)

In the case that it is judged by the save judging section 25 that edit content has not been saved in S1702, the step is shifted to S1705; and in the case that it is judged that edit content has been saved, the step is shifted to S1704.

(S1704)

The printer driver 3000 sends image data that is temporarily stored in the image data temporary storing section 36 to the printer 2 through the sending section 37.

(S1705)

The CPU 101 deletes image data that is temporarily stored in the image data temporary storing section 36.

Next, it is to explain about operation of the save judging section 25 in the case that saving operation of image data is performed in the document process application 10 on the basis of the flow chart of FIG. 16. Moreover, the flow, in a process on the basis of the process S1702 that is performed in FIG. 17, that is, a process of the save judging section 25, serves that contents information is temporarily stored as a prior condition.

(S1601)

The save judging section 25 of the application monitoring section 2000 shifts the step to S1602 if contents information is temporarily stored in the contents first obtaining section 241; and makes the flow complete if contents information is not temporarily stored in the contents temporary storing section 245.

(S1602)

The save judging section 25 instructs to obtain contents information from the information obtaining section 22 with respect to the contents second obtaining section 242.

(S1603)

The save judging section 25 instructs the comparing section 246 to compare contents information that is temporarily stored in the contents temporary storing section 245 with contents information that is obtained from the contents second obtaining section 242 in S1602.

(S1604)

As a result of comparing of the comparing section 246, if the contents information are consistent, the save judging section 25 shifts the step to S1605; and if the contents information are not consistent, the step is shifted to S1606.

(S1605)

The save judging section 25 judges that image data has been saved because its contents information that has been edited is in the contents temporary storing section 245, and shifts the step to S1607 (printable).

(S1606)

In the case that the save judging section 25 judges that the contents information are not consistent in S1604, the application monitoring section 2000 judges that image data has been edited.

(S1607)

The CPU 101, by instructing the save judging section 25, deletes the contents information that is temporarily stored in the contents first obtaining section 241.

According to such image process system 300, if image data that is instructed to print by user corresponds to a specific kind of document, and if the editing process has not been saved, the CPU 101 generates image data and temporarily stores the generated image data, and a message is displayed on the display 108 that urges the saving of the document.

Then, after user can confirm that the content of the saved image data is consistent with the content of the original generated image data, the image data that is temporarily stored is sent to the printer 2. That is, what is being printed is temporarily stored automatically.

As a result, there is an advantage that time and labor for repeating the print instruction is saved after the edit contents of the document is saved.

Moreover, in the respective embodiments mentioned above, it is to explain a case to print image data that is saved for the moment in any one of the storing mediums of the PC 1 by drawing out and reediting it from the storing medium. However, the present invention is not limited to this, it is also possible to be applied even in the case that new image data has not been saved in the storing medium of the PC 1. Further, in the above explanation, the saving place of the image data is served as the hard disc 104, but it may also be served as the RAM 103.

The Utilization Possibility In Industry:

The surrounding apparatus about the image process system of the present invention is applied to the printer. However, the present invention is not limited to this, it may also be applied to a copying machine or a MFP (Multifunction Peripheral).

The present invention is not limited to the foregoing embodiments but many modifications and variations are possible within the spirit and scope of the appended claims of the invention.

What is claimed is:

1. An image process system capable of printing on the basis of image data that is outputted through an image process apparatus, wherein the image process apparatus comprises:
   a storing section storing first image data;
   an editing application that executes a file open, an editing and printing of the first image data stored in the storing section;
   a judging section that compares a present first image data which is opened through the editing application with the first image data stored in the storing section and judges whether the present first image data and the first image data are the same or not the same when the editing application executes printing of the present first image data;
   a print execution judging section that judges to interrupt the printing executed by the editing application when the judging section judges not the same and judges to continue the printing executed by the editing application when the judging section judges the same; and
   an image forming section that forms an image based on the present first image data which is opened through the editing application when the print execution judging section judges to continue the printing.

2. The image process system according to claim 1, wherein the image forming section forms the image in the case that the print execution judging section judges to perform the print.

3. The image process system according to claim 1, wherein the image process apparatus further comprises:
   a notifying section that notifies that the print is not performed in the case that the print execution judging section judges not to perform the print.

4. The image process system according to claim 1, wherein the image process apparatus further comprises:
   a document kind judging section that judges whether or not the present first image data to be printed is a specific kind of image data, and
   the judging section judges whether or not the present first image data to be printed is saved in the storing section in the case that the document kind judging section judges that the present first image data to be printed is the specific kind of image data.

5. The image process system according to claim 4, wherein the document kind judging section performs a judgment on the basis of attribute information, wherein attribute information includes a file name of an electronic file in which the present first image data is saved.

6. The image process system according to claim 1, wherein the image forming section comprises a sending section that sends the present first image data to a printing apparatus, and
   the sending section, in the case that the print execution judging section judges to perform the print immediately, performs a sending of the present first image data.

7. The image process system according to claim 6, wherein the judging section further comprises a second judging section that judges whether or not document data that is consistent with the document data used in the generation of the present first image data has been saved, and
   the sending section, in the case that the print execution judging section judges not to perform the print immediately, sends the present first image data to the printing apparatus, when the second judging section judges that the document data has been saved.

8. The image process system according to claim 7, wherein the image process apparatus further comprises:
   a second notifying section that performs a notification that urges a saving of the present first image data in the case that the print execution judging section judges not to perform the print immediately.

9. The image process system according to claim 1, wherein the image process apparatus further comprises:
   a document kind judging section that judges a kind of the present first image data, and
   the print execution judging section, in the case that the document kind judging section judges that the present first image data is not a specific kind of document, judges to perform the print immediately.

10. The image process system according to claim 9, wherein the document kind judging section performs a judgment on the basis of attribute information of the present first image data to be printed.

11. The image process system according to claim 9, wherein the attribute information is a file name of a file in which the present first image data is saved.

12. The image process system according to claim 1, wherein the judging section judges by comparing content information of the present first image data to be printed and of the corresponding saved image data.

13. The image process system according to claim 12, wherein the content information includes characters.

14. The image process system according to claim 1, wherein in the case that the image forming section judges not to perform the print of the present first image data to be printed based on the judgment result of the judging section,
   the image forming section converts the present first image data to be printed to printable image data and stores it temporarily in a temporary storing section.

15. The image process system according to claim 14, wherein in the case that the image data is stored in the temporary storing section,
   the judging section judges whether the stored image data in the temporary storing section is the same as the corresponding saved image data, and if these two image data are judged to be the same, the image data stored in the temporary storing section is sent to a printing apparatus.

* * * * *